April 9, 1946.   J. E. SPANGLER ET AL   2,398,164
TRANSMISSION ASSEMBLY
Filed Oct. 17, 1944
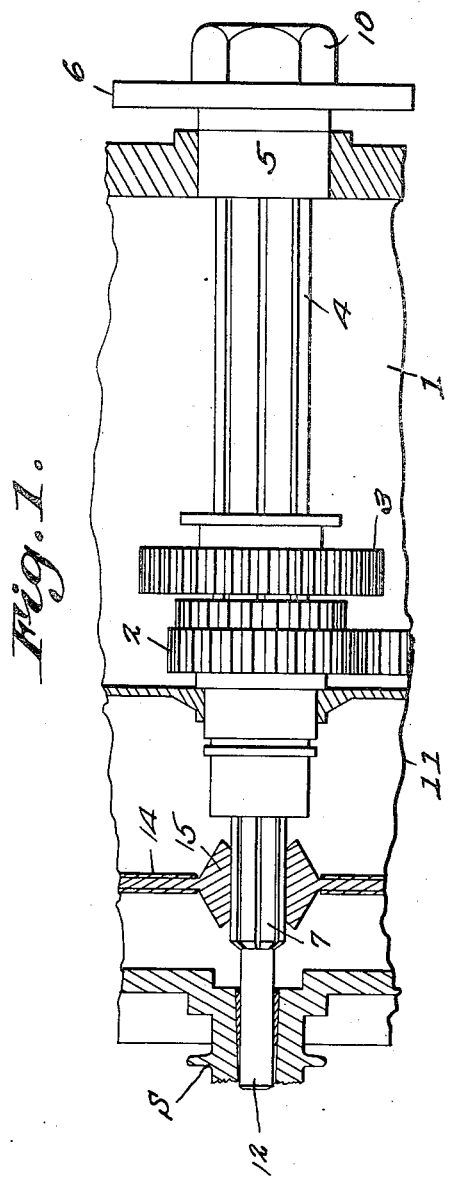
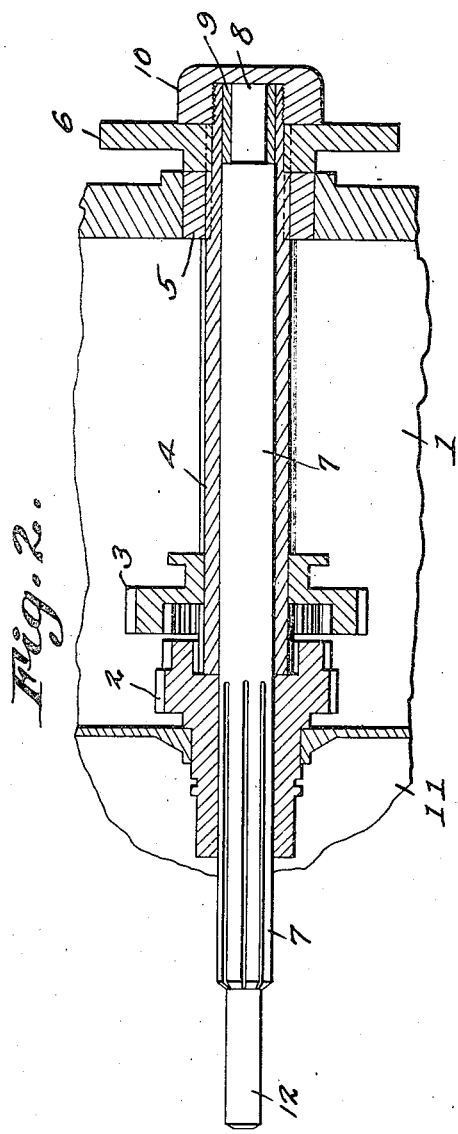
J. E. Spangler
U. A. Cornett
INVENTORS.
BY *Ashron & Co.*
ATTORNEYS.

Patented Apr. 9, 1946

2,398,164

UNITED STATES PATENT OFFICE 2,398,164

TRANSMISSION ASSEMBLY

John E. Spangler and Urban A. Cornett, Gallipolis, Ohio

Application October 17, 1944, Serial No. 559,044

3 Claims. (Cl. 192—3.5)

This invention relates to a transmission assembly of the type used, for example, on automobiles, trucks, etc.

It is a fact well known to automobile mechanics that when it is necessary to change the clutch hub, the transmission assembly must be removed and the clutch release bearing disturbed. This operation is costly because of the time and the skilled labor required.

An object of the present invention is to provide an assembly including a main one-piece clutch shaft which can be removed from and replaced in the main drive gear and the main transmission shaft without disturbing the transmission and the clutch throwout bearing.

A further object is to provide a clutch shaft which is extended entirely through the transmission and has a means for locking it in place at the back of the transmission case, whereby, simply by removing the locking means, the clutch shaft can be slid longitudinally relative to the transmission to permit convenient replacement of the clutch hub.

With the foregoing and other objects in view, which will appear as the description proceeds, the invention consists of certain details of construction and combinations of parts hereinafter more fully described and pointed out in the claims, it being understood that changes may be made in the construction and arrangement of parts without departing from the spirit of the invention as claimed.

In the accompanying drawing, the preferred form of the invention has been shown.

In said drawing:

Figure 1 is a section through a portion of a transmission housing showing the present improvements therein, a portion of the clutch disk and its hub being shown in section on the clutch shaft.

Figure 2 is a central longitudinal section through the parts shown in Figure 1, the clutch shaft being shown in elevation and the clutch disk removed.

Referring to the figures by characters of reference, 1 designates a portion of a transmission housing in which is located the main gear 2 and other gears 3 of the transmission, and also the transmission shaft 4 which, in the present instance is tubular and extended backwardly from the transmission housing. This transmission shaft has a bearing 5 and is extended outwardly from the housing 1 beyond the bearing where it is provided with the usual transmission shaft flange 6.

Mounted within the tubular transmission shaft is the clutch shaft 7, one end of which, indicated at 8, is journaled in a pilot bearing 9 in the adjacent end of the shaft 4, both the bearing and the clutch shaft being held in the transmission shaft by a cap nut 10 removably engaging the projecting end of the shaft 4.

The other end of the clutch shaft 7 is extended beyond the transmission shaft 4 and into the clutch housing 11. The projecting portion of shaft 7 has a reduced end or shank 12 for engagement with the driving or crank shaft S of the engine, with which one of the clutch elements 13 rotates. A portion of the clutch disk has been indicated at 14 and the hub 15 thereof is suitably keyed to the adjacent portion of shaft 7 so as to rotate therewith. The main transmission gear 2 is similarly joined to the shaft 7.

It will be apparent that with the parts constructed and arranged as described, they will all function as normally. However, the present structure has the advantage of permitting quick removal of the clutch disk 14 without disturbing the rest of the structure. This removal is effected by first removing the cap nut 10. Thereafter the clutch shaft 7 is driven longitudinally until it becomes disengaged from the hub 15 of the clutch disk. Said disk can then be removed after the clutch housing has been opened, and thereafter a new clutch disk can be placed in position and the shaft 7 driven back to its former location so as to re-engage the hub and be seated in the crank shaft.

In actual practice it has been found that the cost of changing clutch disks where the present construction is used has been reduced greatly because of the time and skilled labor saved.

What is claimed is:

1. A transmission assembly including a tubular transmission shaft, a main transmission gear, a clutch element having a hub, a driving shaft, and a clutch shaft mounted for rotation in the transmission and driving shafts, said clutch shaft being positioned normally in driving engagement with the hub and gear and being shiftable longitudinally for disengagement from the driving shaft and the hub.

2. A transmission assembly including a tubular transmission shaft, a main transmission gear, a clutch element having a hub, a driving shaft, a clutch shaft mounted to slide and rotate in the transmission and driving shafts, separate means on the gear and hub and on the clutch shaft for maintaining normally a driving connection between the gear, clutch shaft and hub, said clutch shaft being shiftable longitudinally to disengage it from the hub and driving shaft.

3. A transmission assembly including a tubular transmission shaft, a main transmission gear, a clutch element having a hub, a driving shaft, a clutch shaft mounted to slide and rotate in the transmission and driving shafts, separate means on the gear and hub and on the clutch shaft for maintaining normally a driving connection between the gear, clutch shaft and hub, said clutch shaft being shiftable longitudinally to disengage it from the hub and driving shaft, and means on the transmission shaft for holding the clutch shaft against sliding movement.

JOHN E. SPANGLER.
URBAN A. CORNETT.